US007162265B2

(12) United States Patent
Ormson et al.

(10) Patent No.: US 7,162,265 B2
(45) Date of Patent: Jan. 9, 2007

(54) CELLULAR NETWORK ACQUISITION METHOD AND APPARATUS

(75) Inventors: Richard Ormson, Reading (GB); Frederic Gabin, Reading (GB); Darioush Downer, Reading (GB); Nigel Legg, Reading (GB); Osamu Yamashita, Reading (GB)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 10/714,847

(22) Filed: Nov. 18, 2003

(65) Prior Publication Data

US 2004/0235474 A1 Nov. 25, 2004

(30) Foreign Application Priority Data

Nov. 19, 2002 (GB) .................................. 0226977.7

(51) Int. Cl.
H04M 1/00 (2006.01)
(52) U.S. Cl. ............................... 455/552.1; 455/181.3; 455/553.1; 455/435.2
(58) Field of Classification Search ............. 455/552.1, 455/161.3, 553.1, 435.2
See application file for complete search history.

(56) References Cited

U.S. PATENT DOCUMENTS

| 5,574,973 | A | | 11/1996 | Borth et al. | |
|---|---|---|---|---|---|
| 5,960,354 | A | * | 9/1999 | Einola | ........................ 455/454 |
| 6,185,435 | B1 | | 2/2001 | Imura | |
| 6,477,372 | B1 | * | 11/2002 | Otting et al. | ................ 455/434 |
| 6,725,041 | B1 | * | 4/2004 | Nakano | ........................ 455/436 |
| 2004/0043798 | A1 | * | 3/2004 | Amerga et al. | ............. 455/574 |
| 2004/0058679 | A1 | * | 3/2004 | Dillinger et al. | ............. 455/439 |

FOREIGN PATENT DOCUMENTS

EP 0 888 026 A2 12/1998

OTHER PUBLICATIONS

"TS 25.231 VO. 3.0 (Jun. 1999); Technical Specification; 3rd Generation Partnership Project (3GPP); Technical Specification Group (TSG) Radio Access Network (RAN); Working Group 1 (WG1); Physical Layer—Measurements", pp. 1-28.

* cited by examiner

*Primary Examiner*—Jean Gelin
*Assistant Examiner*—Ariel Balaoing
(74) *Attorney, Agent, or Firm*—Sughrue Mion, PLLC

(57) ABSTRACT

The present invention provides for a method of network acquisition for a cellular radio communications device arranged to operate on a plurality of radio technologies and comprising determining the most suitable cell based on a characteristic of signals received from a plurality of cells, the signals from each cell being provided over a band of frequencies, and the method being arranged for taking a series of measurements of the said characteristic for one radio technology and for each frequency, wherein prior to the final measurement in the said series, the said characteristic of at least one measured signal for each frequency is compared with a predetermined value and if the comparison indicates that the radio technology is unlikely to produce a suitable cell, the step of switching to an alternative radio technology prior to the said final measurement in the series being taken and searching signals associated with the alternative radio technology to search for a suitable cell.

11 Claims, 1 Drawing Sheet

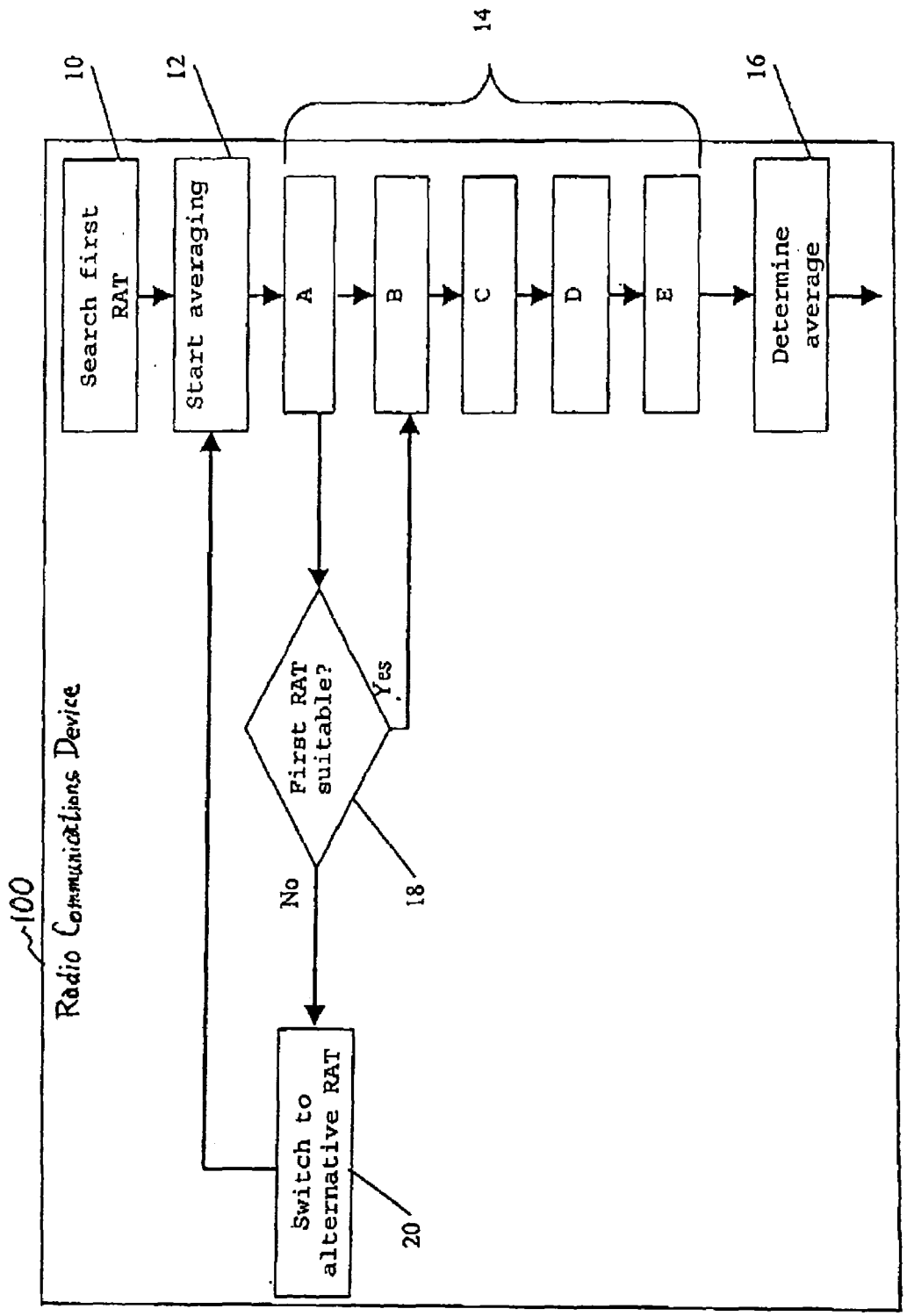

CELLULAR NETWORK ACQUISITION METHOD AND APPARATUS

BACKGROUND OF THE INVENTION

The present invention relates to a method and apparatus for use in network acquisition for cellular communications devices.

Cellular communications devices such as cell phones, have become increasingly popular and widely adopted and in many instances have become the prime means of communication both for business and domestic requirements As such usage becomes more widespread, potentially disadvantageous and limiting features of such devices become more apparent. For example, when a cell phone is first turned on, an acquisition procedure needs to be conducted so that the cell phone can acquire the appropriate communications network and subsequently take part in a communications exchange over that network. The period between turning the cell phone on and actually acquiring the network does not generally go unnoticed by the user and comprises dead time as far as the user is concerned since no other operations over and above network acquisition are conducted during that period. The longer the time period required to acquire the network, the more likely this period is to be noticed by the user and so as to lead to potential irritation. Also, network acquisition procedures require the cell phone handset to expend a significant amount of power relative to power requirements arising merely for communication procedures.

Indeed, in view of the different mobile communication modes that have arisen, and the subsequent requirement for cell phone handsets to offer dual mode, or indeed multimode, operability, it will become increasingly necessary for each handset to search on more than one mode. Thus potential delays m network acquisition, and related user irritation, could become more frequently experienced. As explained further below network acquisition requires a search through a set of frequencies—generally defined by a frequency band in an attempt to identify the most suitable cell of a network. With dual mode operation, there will be multiple sets of frequencies to search through in order not only to find the most suitable cell, but also the most suitable network given the at least dual mode operability of the handset.

SUMMARY OF THE INVENTION

The present invention seeks to provide for a network acquisition method and apparatus which exhibits advantages over known such methods and apparatus.

According to one aspect of the present invention, there is provided a method of network acquisition for a cellular radio communications device arranged to operate on a plurality of radio technologies and comprising determining the most suitable cell based on a characteristic of signals received from a plurality of cells, the signals from each cell being provided over a band of frequencies, and the method being arranged for taking a series of measurements of the said characteristic for one radio technology and for each frequency, wherein prior to the final measurement in the said series, the said characteristic of at least one measured signal for each frequency is compared with a predetermined value and if the comparison indicates that the radio technology is unlikely to produce a suitable cell, the step of switching to an alternative radio technology prior to the said final measurement in the series being taken and searching signals associated with the alternative radio technology to search for a suitable cell.

The invention is advantageous in that it can serve to significantly enhance the operation of network search in a multimode system and, in particular, where the preferred network is one that offers limited coverage such as in early third generation deployments.

The invention therefore proves advantageous in reducing the dead time experienced by the user of the device, and also reducing the power requirements of the device for network acquisition procedures.

Preferably, the method involves searching the alternative radio technology in the same manner as the initial radio technology was searched.

In one particular embodiment, the characteristic of the first in the series of signals for each frequency is compared with the predetermined value so as to identify whether the radio technology is likely to produce a suitable cell.

Of course, the earlier this determination is conducted within the series of measurements, the greater the time and power savings can prove to be. The said predetermined value relating to the characteristic for the signal is generally determined per device and per radio technology.

According to another aspect of the present invention there is provided a cellular radio communications device arranged for operation on a plurality of radio technologies and including means for determining the most suitable cell based upon a characteristic of signals received from a plurality of cells and the signals from each cell being provided over a band frequencies, means for taking a series of measurements of the said characteristic for one radio technology for each frequency, and including means for, prior to the final measurement in the said series being taken, comparing the said characteristic of at least one measured signal for each frequency with a predetermined value and determining that, if the comparison indicates that the radio technology is unlikely to produce a suitable cell, initiating means for switching to an alternative radio technology prior to the said final measurement in the series, and for searching signals associated with the alternative radio technology to search for a suitable cell.

As will be appreciated, the device according to the present invention as defined above can be arranged to operate in accordance with any of the method steps mentioned hereinbefore.

BRIEF DESCRIPTION OF THE DRAWING

A diagram of a radio communications device which carries out a network acquisition method according to an embodiment of this invention.

DESCRIPTION OF THE PREFERRED EMBODIMENT

The invention is described further hereinafter, by way of example only, with reference to the accompanying drawing.

As will be appreciated, under the 3GPP (3rd Generation Partnership) specifications a handset (or a radio communications device) is required to search one entire radio access technology (RAT) at a time. The relative priority of RATs is set within the handset and so in a dual mode GSM/UMTS handset, an initial search of GSM (Global System for Mobile Communications) or UMTS (Universal Mobile Telecommunications System) will be undertaken and the process will only look at the second RAT during initial selection if no suitable cells are found on the first RAT.

The initial search is a simple one, using signal strength, or a derivative thereof the cells are ranked in order of signal strength and the cell at the top of the list is accessed for suitability. The 3GPP requirements indicate that five measurements per frequency over a period of no less than three seconds should be averaged to produce this ranking.

If there is no network present on the RAT being observed the above procedure is clearly wasteful. The invention propose that a quick check to be made after the first of the five measurements per frequency has been made if no frequencies have been found with the signal strengths of a usable level—which can be determined per handset and per RAT—then the entire RAT should be skipped and measurements begun on the next RAT.

Turning to the drawing, the method according to an embodiment of the present invention is carried out in a radio communications device 100 and commences at step 10 by initiating a search of the first RAT. Such activity involves commencement of the averaging sequence 12 in which five measurements 14, identified as A–E are taken on each frequency in the band of frequency in order to determine an average value per frequency at step 16.

However, it is noted that conducting all of the measurements A–E can prove to be a potential waste of time and power if the RAT being searched does not eventually provide a suitable cell.

Thus, according to an illustrated embodiment of the present invention, subsequent to the initial measurement A in the series of five measurements 14, the result of measurement A per frequency is compared at step 18 with a predetermined value in order to assess whether or not the RAT being searched is likely to produce a suitable cell. This search is conducted on the basis of a stored characteristic of the signal such as signal strength or a derivative thereof.

If, at step 18, it is determined on the basis of the initial measurement A in the series of five measurements 14 that the RAT identified for searching at step 10 is likely to produce a suitable cell, then the method returns to the series of measurements 14 at the second measurement B so that this measurement, and the subsequent measurements C–E can be taken so as to arrive at the average value per frequency for the RAT being searched at step.

If, however, at step 18 the initial quick check against measurement A indicates that the RAT being searched is unlikely to produce a suitable cell, then the method proceeds to step 20 and switches to an alternative RAT available to the cellular radio communications device.

Once having switched to the alternative RAT at step 20, the method returns to step 12 to commence an averaging sequence for the alternative RAT.

Here, the complete sequence A–E can be conducted or, again, and particularly if multiple RATs are available, the procedure continuous by way of an initial loop via step 18 to determine if the alternative RAT is likely to produce a suitable cell.

If for some reason it is determined that a RAT that has been identified as unlikely to produce a suitable cell should still be searched further, then the method can be configured so that the averaging sequence of steps A–E is nevertheless conducted so as to verify the suitability, or lack of suitability, of that particular RAT.

It should of course be appreciated that the present invention is not restricted to any particular form of dual mode, or multimode device.

What is claimed is:

1. A method of network acquisition for a cellular radio communications device arranged to operate on a plurality of radio technologies and comprising determining the most suitable cell based on a characteristic of signals received from a plurality of cells, the signals from each cell being provided over a band of frequencies, and the method being arranged for taking a series of measurements of the said characteristic for one radio technology and for each frequency, wherein the characteristic of the received signals is compared with a predetermined value after the first measurement in the series of measurements to be taken so as to obtain an average value and continuing with an averaging sequence on a radio technology even if it is determined that no suitable cell is likely to be identified, and wherein prior to the final measurement in the said series, the said characteristic of at least one measured signal for each frequency is compared with a predetermined value and if the comparison indicates that the radio technology is unlikely to produce a suitable cell, the step of switching to an alternative radio technology prior to the said final measurement in the series being taken and searching signals associated with the alternative radio technology to search for a suitable cell.

2. A method as claimed in claim 1 and including the steps of searching on the alternative radio technology in the same manner as searching on an original radio technology.

3. A method as claimed in claim 1 or 2, wherein the said predetermined value is set in the cellular radio communications device.

4. A method as claimed in claim 1 or 2, wherein the said predetermined value is set for each radio technology.

5. A method as claimed in claim 1 or 2, wherein the said characteristic of the signals comprises signal strength.

6. A method as claimed in claim 1 or 2, wherein the said characteristic of the signals comprises a derivative of signal strength.

7. A method as claimed in claim 1 or 2 and arranged for use in accordance with a dual mode, or multimode device.

8. A cellular radio communications device arranged for operation on a plurality of radio technologies and including means for determining the most suitable cell based upon a characteristic of signals received from a plurality of cells and the signals from each cell being provided over a band frequencies, means for taking a series of measurements of the said characteristic for one radio technology for each frequency, means for comparing the characteristic of the received signals with a predetermined value after the first measurement in the series of measurements to be taken so as to obtain an average value and continuing with an averaging sequence on a radio technology even if it is determined that no suitable cell is likely to be identified, and including means for, prior to the final measurement in the said series being taken, comparing the said characteristic of at least one measured signal for each frequency with a predetermined value and determining that, if the comparison indicates that the radio technology is unlikely to produce a suitable cell, initiating means for switching to an alternative radio technology prior to the said final measurement in the series, and for searching signals associated with the alternative radio technology to search for a suitable cell.

9. A method for operating a cellular radio communications device arranged for operation on a plurality of radio technologies and including means for determining the most suitable cell based upon a characteristic of signals received from a plurality of cells and the signals from each cell being provided over a band frequencies, means for taking a series of measurements of the said characteristic for one radio technology for each frequency, means for comparing the characteristic of the received signals with a predetermined value after the first measurement in the series of measurements to be taken so as to obtain an average value and continuing with an averaging sequence on a radio technology even if it is determined that no suitable cell is likely to be identified, and including means for, prior to the final measurement in the said series being taken, comparing the said characteristic of at least one measured signal for each frequency with a predetermined value and determining that, if the comparison indicates that the radio technology is unlikely to produce a suitable cell, initiating means for switching to an alternative radio technology prior to the said final measurement in the series, and for searching signals associated with the alternative radio technology to search for a suitable cell, comprising a method according to claim 1 or 2.

10. A method of network acquisition for a cellular radio communications device arranged to operate on a plurality of radio access technologies and comprising determining the most suitable cell based on a characteristic of signals received from a plurality of cells, the signals from each cell being provided over a band of frequencies, and the method being arranged for taking a series of measurements of the said characteristic for one radio access technology and for each frequency, wherein the characteristic of the received signals is compared with a predetermined value after the first measurement in the series of measurements to be taken so as to obtain an average value and continuing with an averaging sequence on a radio technology even if it is determined that no suitable cell is likely to be identified, and if the comparison indicates that the radio access technology is unlikely to produce a suitable cell, the step of switching to an alternative radio access technology prior to the said final measurement in the series being taken and searching signals associated with the alternative radio access technology to search for a suitable cell.

11. A cellular radio communications device arranged for operation on a plurality of radio access technologies and including means for determining the most suitable cell based upon a characteristic of signals received from a plurality of cells and the signals from each cell being provided over a band frequencies, means for taking a series of measurements of the said characteristic for one radio access technology for each frequency, and including means for, after the first measurement in the said series being taken, comparing the said characteristic of at least one measured signal for each frequency with a predetermined value so as to obtain an average value and continuing with an averaging sequence on a radio technology even if it is determined that no suitable cell is likely to be identified, and determining that, if the comparison indicates that the radio access technology is unlikely to produce a suitable cell, initiating means for switching to an alternative radio access technology prior to said final measurement in the series, and for searching signals associated with the alternative radio access technology to search for a suitable cell.

\* \* \* \* \*